US012098043B2

(12) United States Patent
Saito

(10) Patent No.: US 12,098,043 B2
(45) Date of Patent: Sep. 24, 2024

(54) IMAGE FORMING APPARATUS

(71) Applicant: CANON KABUSHIKI KAISHA, Tokyo (JP)

(72) Inventor: Takaaki Saito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 17/881,272

(22) Filed: Aug. 4, 2022

(65) Prior Publication Data

US 2023/0047690 A1 Feb. 16, 2023

(30) Foreign Application Priority Data

Aug. 13, 2021 (JP) ................................ 2021-132030

(51) Int. Cl.

*B65H 31/24* (2006.01)
*G03G 15/00* (2006.01)
*G03G 15/20* (2006.01)

(52) U.S. Cl.

CPC ......... *B65H 31/24* (2013.01); *G03G 15/2028* (2013.01); *G03G 15/6529* (2013.01); *B65H 2513/51* (2013.01)

(58) Field of Classification Search

CPC ................ B65H 31/24; B65H 2513/51; B65H 2601/261; B65H 2405/332; B65H 2405/3322; B65H 2511/414; B65H 2511/415; B65H 2511/40; G03G 15/6529; G03G 15/2028

See application file for complete search history.

(56) References Cited

U.S. PATENT DOCUMENTS 8,509,645 B2 * 8/2013 Ikegami ............ G03G 15/2042 399/82
10,386,758 B2 * 8/2019 Ishiguro ................ B41J 29/377
2019/0025736 A1 * 1/2019 Ishiguro ............ G03G 15/5083

FOREIGN PATENT DOCUMENTS

JP 2003-248349 A 9/2003

* cited by examiner

Primary Examiner — Leslie A Nicholson, III

(74) *Attorney, Agent, or Firm* — Canon U.S.A., Inc. I.P. Division

(57) ABSTRACT

An image forming apparatus includes a printing unit, first and second stacking units, first and second conveyance units, and a control unit. When the first conveyance unit conveys a sheet to the first stacking unit, the printing unit prints an image on a first number of sheets as first sheets in a first printing operation and prints the image on the first sheets in a second printing operation. When the second conveyance unit conveys the sheet to the second stacking unit, the printing unit prints the image on a second number of sheets, greater than the first number of sheets, as second sheets in the first printing operation and prints the image on the second sheets in the second printing operation. A number of sheets printed per unit time in the second printing operation is less than a number of sheets printed per unit time in the first printing operation.

6 Claims, 8 Drawing Sheets

FIG.4

| | NUMBER OF PRINTED SHEETS | PRODUCTIVITY DURING NORMAL OPERATION | PRODUCTIVITY WHEN ANTI-BLOCKING MEASURES ARE TAKEN |
|---|---|---|---|
| FIRST TRAY | 70 | 100% | 50% |
| SECOND TRAY | 85 | 100% | 75% |

FIG.5

| | NUMBER OF PRINTED SHEETS | SUSPENSION PERIOD FOR TAKING ANTI-BLOCKING MEASURES |
|---|---|---|
| FIRST TRAY | 70 | 20 SECONDS |
| SECOND TRAY | 85 | 15 SECONDS |

IMAGE FORMING APPARATUS

BACKGROUND

Field

The present disclosure relates to an image forming apparatus that forms an image on a sheet.

Description of the Related Art

An electrophotographic image forming apparatus that develops an electrostatic latent image formed on a photosensitive member with toner and transfers and fixes the developed toner image onto a recording sheet has heretofore been known. A fixing unit that performs a fixing process fixes an image onto a sheet by heating a toner image. Sheets subjected to the fixing process are discharged by a discharge unit and are stacked on a stacking unit.

The sheets that have passed through the fixing unit have a temperature higher than a melting point of toner. If the sheets are brought into contact with each other in such a high-temperature state, a phenomenon in which the sheets adhere to each other due to toner fusion (this phenomenon is hereinafter referred to as blocking) occurs in the stacking unit (Japanese Patent Application Laid-Open No. 2003-248349).

An image forming apparatus including a first stacking unit and a second stacking unit on which discharged sheets are stacked is known. In this case, when the sheets are discharged onto the first stacking unit and the second stacking unit, respectively, the temperature of the sheet that has passed through a conveyance path toward the first stacking unit can be different from the temperature of the sheet that has passed through a conveyance path toward the second stacking unit. For example, the temperature of the sheet conveyed to the corresponding stacking unit through a longer conveyance path is lower than the temperature of the sheet conveyed to the corresponding stacking unit through a shorter conveyance path, so that blocking is less likely to occur. This is because the temperature of each sheet gradually decreases while the sheet is conveyed from the fixing unit and stacked on the stacking unit. In addition, the sheets that have passed through a conveyance path cooled by a cooling device such as an air blowing fan can be cooled by the fan, so that blocking is less likely to occur.

SUMMARY

The present disclosure is directed to preventing deterioration in productivity while preventing occurrence of blocking in an image forming apparatus including a plurality of stacking units.

According to an aspect of the present disclosure, an image forming apparatus includes a printing unit configured to print an image on a sheet and including a fixing unit configured to fix the image onto the sheet with heat, a first conveyance unit configured to convey the sheet on which the image is printed by the printing unit, a first stacking unit on which the sheet conveyed by the first conveyance unit is to be stacked, a second conveyance unit configured to convey the sheet on which the image is printed by the printing unit and having a cooling capability higher than a cooling capability of the first conveyance unit, a second stacking unit on which the sheet conveyed by the second conveyance unit is to be stacked, and a control unit configured to control the printing unit, wherein, in a case where the sheet is conveyed to the first stacking unit by the first conveyance unit, the control unit controls the printing unit to print the image on a first number of sheets as first sheets in a first printing operation and then to print the image on the first sheets in a second printing operation, wherein, in a case where the sheet is conveyed to the second stacking unit by the second conveyance unit, the control unit controls the printing unit to print the image on a second number of sheets as second sheets in the first printing operation and then is caused to print the image on the second sheets in the second printing operation, and wherein a number of sheets printed per unit time in the second printing operation is less than a number of sheets printed per unit time in the first printing operation, and the second number of sheets is greater than the first number of sheets.

Further features of the present disclosure will become apparent from the following description of exemplary embodiments with reference to the attached drawings.

BRIEF DESCRIPTION OF THE DRAWINGS

FIG. 4 is a table illustrating the number of sheets stacked before starting anti-blocking measures for each discharge tray and productivity when anti-blocking measures are taken on each discharge tray according to the first exemplary embodiment.

FIG. 5 is a table illustrating the number of sheets stacked before starting anti-blocking measures for each discharge tray and a radiation period when anti-blocking measures for each discharge tray are taken according to a second exemplary embodiment.

DESCRIPTION OF THE EMBODIMENTS

Exemplary embodiments of the present disclosure will be described in detail below with reference to the drawings. However, components described in the exemplary embodiments are merely examples, and the scope of the disclosure is not limited only to the components.

<Image Forming Apparatus>

Figure 1:
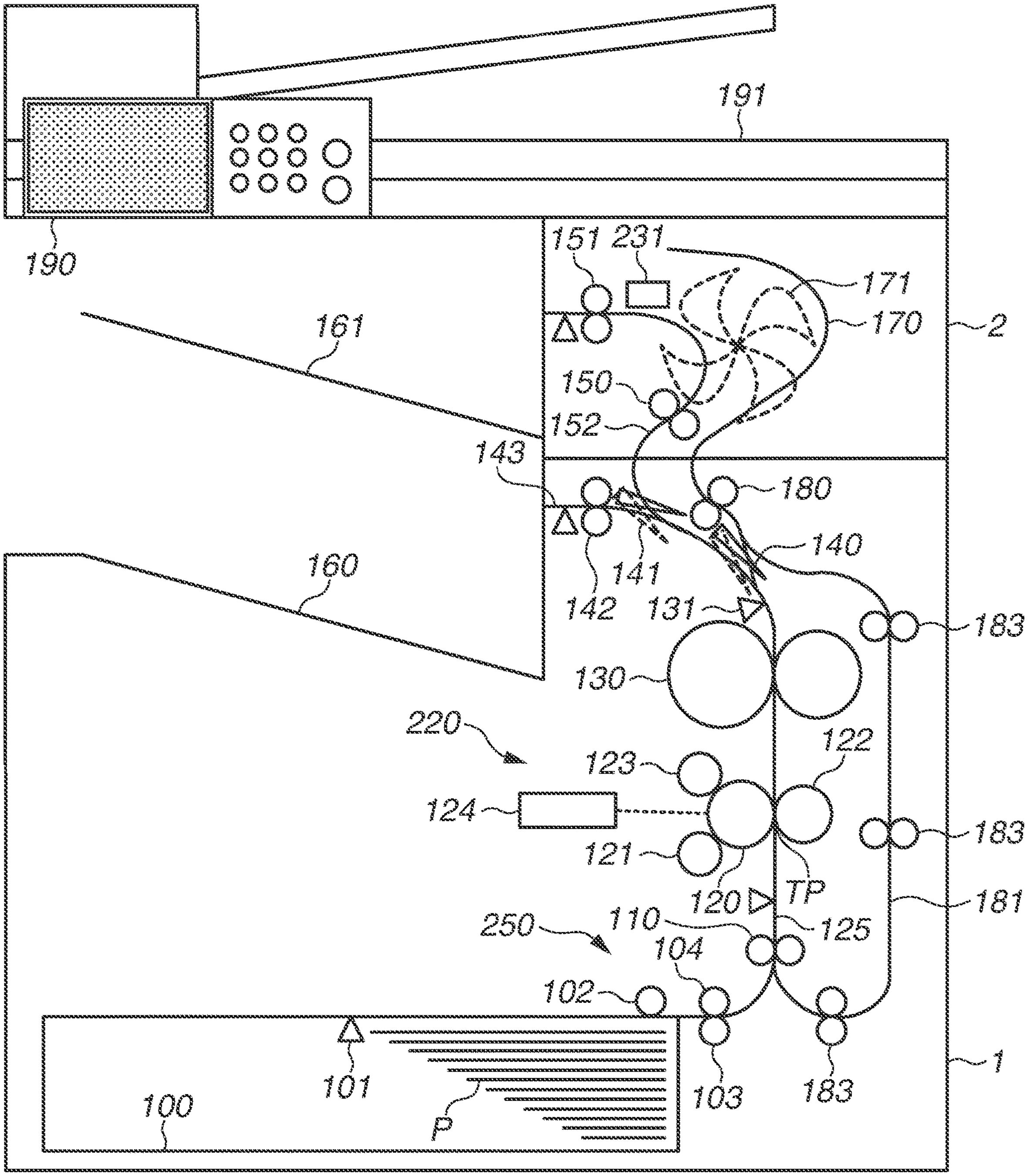
FIG. 1 is a sectional view of an image forming apparatus according to a first exemplary embodiment.

A first exemplary embodiment will be described. FIG. 1 is a sectional view of an image forming apparatus 1. The image forming apparatus 1 forms an image on a sheet using an electrophotographic image forming process. Examples of the image forming apparatus 1 include an electrophotographic copying machine (e.g., a digital copying machine), an electrophotographic printer (e.g., a color laser beam printer and a color light-emitting diode (LED) printer), a multifunction peripheral (MFP), and a facsimile apparatus.

The image forming apparatus 1 forms a black-and-white image. However, the image forming apparatus 1 according to the present exemplary embodiment is not limited to this example. The image forming apparatus 1 may form a color image. A sheet used as a recording sheet is a transfer material on which an image is formed by the image forming apparatus 1. Examples of the sheet include paper, an overhead projector (OHP) sheet, and cloth. The image forming apparatus 1 is provided with an image reading unit 191 that reads an image on a document. However, the image forming apparatus 1 need not necessarily be provided with the image reading unit 191. The image forming apparatus 1 can be provided with a discharge unit 2 such as a post-processing device (discharge unit) that performs post-processing on sheets P. The discharge unit 2 according to the present exemplary embodiment is an option device. In other words, the discharge unit 2 is detachably attached to a main body of the image forming apparatus 1. The image forming apparatus 1 can be operated even in a state where the discharge unit 2 is detached from the main body. While the present exemplary embodiment illustrates a configuration in which the discharge unit 2 is an option device, the discharge unit 2 may be incorporated in the image forming apparatus 1.

The image forming apparatus 1 includes an image forming unit 220 as an image forming unit that forms an image on each sheet P. The image forming unit 220 includes a photosensitive drum (image carrying member) 120 as a photosensitive member. A charging device 123, an exposure device 124, a developing device 121, and a transfer roller 122 serving as a transfer device are located near the photosensitive drum 120. The transfer roller 122 is opposed to the photosensitive drum 120 and forms a transfer portion TP. The charging device 123 uniformly charges the surface of the photosensitive drum 120. The exposure device 124 emits a light beam modulated based on image data to the uniformly charged surface of the photosensitive drum 120, thereby forming an electrostatic latent image on the surface of the photosensitive drum 120. The developing device 121 develops the electrostatic latent image with toner, thereby forming a toner image.

A feeding cassette 100 that stores the sheets P is located below the image forming apparatus 1.

The image forming apparatus 1 includes a conveyance unit 250 that conveys the sheets P stored in the feeding cassette 100. The conveyance unit 250 that forms a printing unit with the image forming unit 220 includes a pickup roller 102, a feeding roller 104, a retard roller 103, registration rollers 110, and a drive motor for driving each roller. The conveyance unit 250 further includes first discharge rollers 142, reversing rollers 180, conveyance rollers 183 located on a duplex conveyance path 181, and a drive motor for driving each roller.

The pickup roller 102 picks up the sheets P stored in the feeding cassette 100. The sheets P picked up by the pickup roller 102 are separated one by one and fed by the feeding roller 104 and the retard roller 103. Each sheet P fed by the feeding roller 104 is brought into contact with the registration rollers 110 that are not rotated, thereby correcting a skew of the sheet P. The registration rollers 110 start to rotate so that a leading edge of the sheet P is aligned with a leading edge of the toner image on the surface of the photosensitive drum 120 at the transfer portion TP, and conveys the sheet P to the transfer portion TP through a substantially vertical conveyance path 125. The transfer roller 122 transfers the toner image formed on the photosensitive drum 120 onto the sheet P. A fixing roller 130 serving as a fixing unit is located on a downstream side of the transfer portion TP in a conveyance direction of the sheet P. The fixing roller 130 applies heat and pressure to the toner image on the sheet P to fix the toner image onto the sheet P, thereby forming the image on the sheet P.

The image forming apparatus 1 is provided with a first tray 160 as a first stacking unit. The discharge unit 2 is provided with a second tray 161 as a second stacking unit. As illustrated in FIG. 1, the sheet P having the image formed thereon is discharged onto the first tray 160 and stacked on the first tray 160, or is discharged onto the second tray 161 and stacked on the second tray 161.

<Discharge Unit>

As illustrated in FIG. 1, the discharge unit 2 is attached to an upper portion of the image forming apparatus 1.

In the present exemplary embodiment, the discharge unit 2 is located between the image forming apparatus 1 and the image reading unit 191. The image reading unit 191 is located at an upper portion of the discharge unit 2.

The discharge unit 2 includes the second tray 161 onto which the sheet P having the image formed thereon is discharged, and a second conveyance path 152 through which the sheet P having the image formed thereon by the image forming unit 220 passes toward the second tray 161. The second conveyance path 152 is provided with inlet rollers 150 that receive the sheet P from the image forming apparatus 1, and second discharge rollers 151 that discharge the sheet P onto the second tray 161 from the second conveyance path 152.

The discharge unit 2 also includes a duplex reversing guide (whereinafter referred to as a second reversing guide) 170 through which the sheet P conveyed by the reversing rollers 180 serving as a duplex reversing unit is temporarily conveyed to reverse the front surface and the back surface of the sheet P. The discharge unit 2 also includes a fan 171 as an air blowing unit that blows air into the discharge unit 2. The discharge unit 2 also includes a post-processing unit 231 that performs post-processing on the sheet P having the image formed thereon.

The post-processing unit 231 included in the discharge unit 2 is configured to perform post-processing such as alignment and sorting of the sheets P. In other words, the discharge unit 2 can execute post-processing to discharge the sheets P onto the second tray 161 by shifting the sheets P in the right-left direction using a shift mechanism (not illustrated). The post-processing unit 231 can be configured to perform punching and binding of the sheets P as post-processing. In the present exemplary embodiment, the discharge unit 2 including a function for executing post-processing is illustrated by way of example. Alternatively, the discharge unit 2 that does not include the function for executing post-processing and includes only a function for discharging the sheets P may be used.

<Conveyance Path>

A conveyance path for conveying each sheet P in the image forming apparatus 1 will be described below with reference to FIG. 1. In the case of discharging each sheet P onto the first tray 160, a discharge flapper 141 is rotated upward as indicated by a solid line in FIG. 1 to discharge the sheet P onto the first tray 160 by the first discharge rollers 142 through a discharge conveyance path (hereinafter referred to as a first conveyance path) 143. In the case of discharging each sheet P onto the second tray 161, the discharge flapper 141 is rotated downward as indicated by a dashed line in FIG. 1 to discharge the sheet P onto the second tray 161 by the second discharge rollers 151 through the second conveyance path 152. In this case, the path length of the first conveyance path 143 through which the sheet P is discharged onto the first tray 160 is shorter than the path length of the second conveyance path 152 through which the sheet P is discharged onto the second tray 161.

In the case of executing double-sided printing in a state where the discharge unit 2 is attached to the image forming apparatus 1, a duplex flapper 140 is rotated downward as indicated by a dashed line in FIG. 1 to convey the sheet P having the image formed on a first surface (front surface) thereof to the reversing rollers 180. The reversing rollers 180 are normally rotated to convey the sheet P to the second reversing guide 170 of the discharge unit 2. The reversing rollers 180 are reversely rotated to convey the sheet P from the second reversing guide 170 to the duplex conveyance path 181 provided in the image forming apparatus 1. Thus, the front surface and the back surface of the sheet P are reversed. The sheet P is caused to pass through the duplex conveyance path 181 by the conveyance rollers 183 and is conveyed to the transfer portion TP by the registration rollers 110. The image forming unit 220 forms an image on the second surface (back surface) of the sheet P. Then, the sheet P is discharged onto the first tray 160 or the second tray 161.

<Control System>

Figure 2:
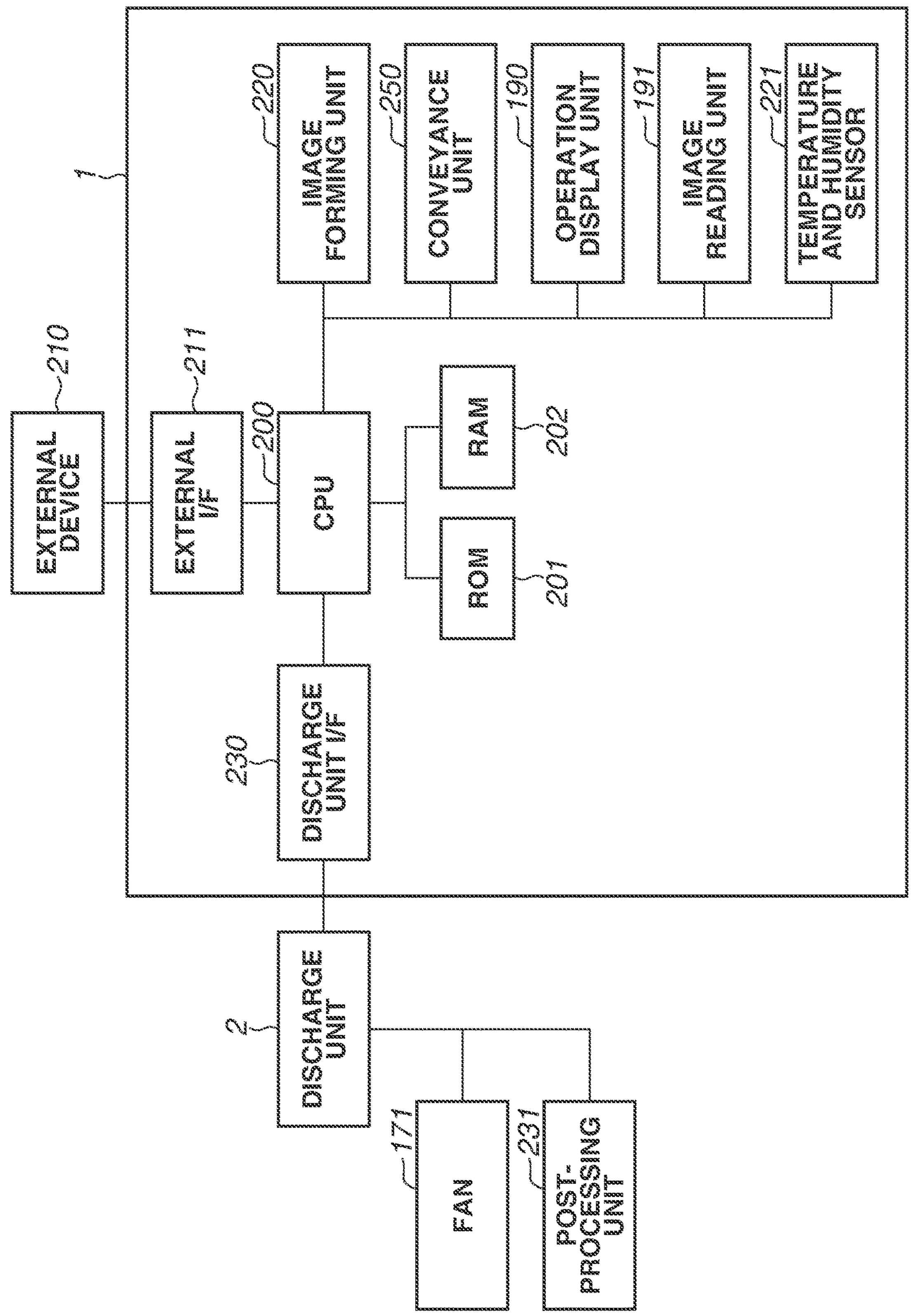
FIG. 2 is a block diagram illustrating a system configuration of the image forming apparatus.

A control system for controlling the image forming apparatus 1 will be described below with reference to FIG. 2. FIG. 2 is a block diagram illustrating the control system for controlling the image forming apparatus 1. The control system includes a central processing unit (CPU) 200, a read-only memory (ROM) 201, and a random access memory (RAM) 202. The CPU 200 serving as a control unit is connected to an external device 210 such as a personal computer (PC) via an external interface (I/F) 211 such as a universal serial bus (USB) cable. The CPU 200 is connected to the discharge unit 2 via a discharge unit I/F 230. The CPU 200 is electrically connected to each of the image forming unit 220, the conveyance unit 250, an operation display unit 190, the image reading unit 191, and a temperature and humidity sensor 221. The CPU 200 is connected to the conveyance unit 250 and controls the conveyance of each sheet P.

The CPU 200 acquires information about image formation on the sheet P (this information is hereinafter referred to as print information) from the external device 210 via the external I/F 211, and starts print processing (image forming operation).

When a user operates the operation display unit 190 to execute a copy operation using the image reading unit 191, the CPU 200 acquires print information from each of the operation display unit 190 and the image reading unit 191 and starts print processing. The CPU 200 executes print processing on the image forming apparatus 1 using the print information based on a control program stored in the ROM 201. The CPU 200 writes processing data on print processing into the RAM 202, and reads out the processing data from the RAM 202.

The CPU 200 controls the image forming unit 220 to form a toner image on the surface of the photosensitive drum 120, transfer the toner image onto the sheet P by the transfer roller 122, and fix the toner image onto the sheet P by the fixing roller 130. The CPU 200 controls the reversing rollers 180 of the conveyance unit 250 to reverse the front surface and the back surface of the sheet P having an image formed on the front surface thereof so that an image can be formed on the back surface of the sheet P.

The CPU 200 acquires user operation information from the operation display unit 190. The CPU 200 also controls the operation display unit 190 serving as a display unit to display information about image formation (print information), warning, and the like. The CPU 200 also controls the image reading unit 191 to read an image on a document.

The user operation information supplied from the operation display unit 190 serving as a setting unit includes setting information about a discharge destination, specifically, information about one of the first tray 160 and the second tray 161 to which the sheets P are discharged.

The temperature and humidity sensor (temperature and humidity detector) 221 serving as an environment sensor detects the temperature and humidity around the image forming apparatus 1. The CPU 200 stores the temperature and humidity detected by the temperature and humidity sensor 221 into a storage unit such as the RAM 202. The CPU 200 drives the fan 171 provided in the discharge unit 2 via the discharge unit I/F 230. The CPU 200 also drives the post-processing unit 231 provided in the discharge unit 2 via the discharge unit I/F 230.

<Basic Operation of Image Forming Apparatus>

Figure 3:
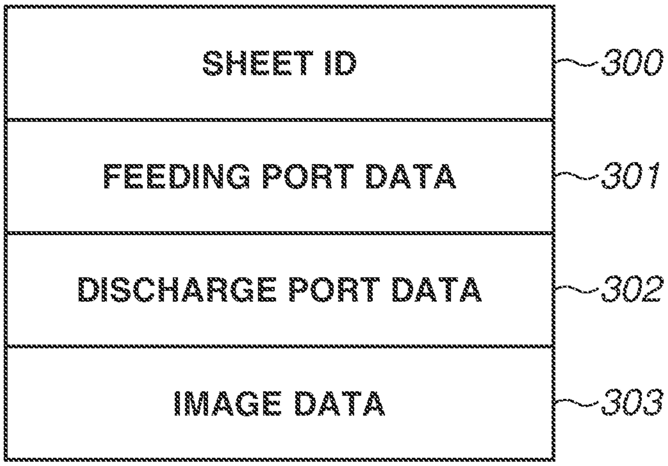
FIG. 3 schematically illustrates print information of each page.

Next, a basic operation of the image forming apparatus 1 in a state where the discharge unit 2 is attached to the image forming apparatus 1 will be described with reference to FIGS. 1 and 2. Upon acquiring print information from the external device 210, the CPU 200 starts print processing. The print information will now be described with reference to FIG. 3. FIG. 3 illustrates print information 310. The print information 310 is created for each page. The print information 310 includes a sheet identification (ID) 300, feeding port data 301, discharge port data 302, and image data 303. The CPU 200 stores the print information 310 into the RAM 202, and reads out the print information 310 from the RAM 202 during print processing.

The sheet ID 300 is information for identifying a sheet type and is allocated to each sheet P. The feeding port data 301 is information for designating a feeding port to feed the sheet P on which an image is to be formed. In the present exemplary embodiment, the feeding port data 301 is information for designating the feeding cassette 100 or the duplex conveyance path 181. The discharge port data 302 is information for designating a discharge port to discharge the sheet P having the image formed thereon. Specifically, the discharge port data 302 includes data indicating one of the first tray 160 and the second tray 161 to which the sheet P is discharged. More specifically, the discharge port data 302 is information for designating one of the first tray 160, the second tray 161, and the duplex conveyance path 181. In the case of double-sided printing, the sheet ID 300 in print information on the first surface and the sheet ID 300 in print information on the second surface designate the same sheet type, and the discharge port data 302 in the print information on the first surface and the feeding port data 301 in the print information on the second surface designate the duplex conveyance path 181. The image data 303 is data on an image to be formed on the sheet P.

If the feeding cassette 100 is designated by the feeding port data 301 based on the print information 310, the CPU 200 starts feeding the sheets P from the feeding cassette 100 by the pickup roller 102. The CPU 200 separates the sheets P one by one using the feeding roller 104 and the retard roller 103, and feeds the sheets P to the registration rollers 110. The CPU 200 uses a sheet sensor 101 to detect the presence or absence of the sheets P in the feeding cassette 100.

The CPU 200 causes the registration rollers 110 to start to rotate in synchronization with the formation of the toner image on the surface of the photosensitive drum 120 by the developing device 121, thereby conveying each sheet P to the transfer portion TP. The CPU 200 causes the transfer roller 122 to transfer the toner image formed on the photosensitive drum 120 onto the sheet P. The CPU 200 causes the transfer roller 122 to convey the sheet P to the fixing roller 130. The CPU 200 causes the fixing roller 130 to apply heat and pressure to the toner image to thereby fix the toner image onto the sheet P.

When the leading edge of the sheet P having the image formed thereon is detected by a fixing sensor 131, the CPU 200 changes the direction of each of the duplex flapper 140 and the discharge flapper 141 based on the discharge port data 302. When the first tray 160 is designated by the discharge port data 302, the CPU 200 changes the direction of the duplex flapper 140 to the direction indicated by the solid line in FIG. 1 and changes the direction of the discharge flapper 141 to the direction indicated by the solid line in FIG. 1. The sheet P is conveyed to the first discharge rollers 142. The CPU 200 causes the first discharge rollers 142 to discharge the sheet P onto the first tray 160 in a state where the surface (print surface) of the sheet P having the image formed thereon faces downward.

When the second tray 161 is designated by the discharge port data 302, the CPU 200 changes the direction of the duplex flapper 140 to the direction indicated by the solid line in FIG. 1 and changes the direction of the discharge flapper 141 to the direction indicated by the dashed line in FIG. 1. The sheet P is conveyed to the inlet rollers 150 of the discharge unit 2. The CPU 200 drives the post-processing unit 231 of the discharge unit 2 via the discharge unit I/F 230 to cause the inlet rollers 150 to convey the sheet P to the second discharge rollers 151 via the second conveyance path 152. The CPU 200 causes the second discharge rollers 151 to discharge the sheet P onto the second tray 161 in a state where the surface (print surface) of the sheet P having the image formed thereon faces downward.

When the duplex conveyance path 181 is designated by the discharge port data 302, the CPU 200 changes the direction of the duplex flapper 140 to the direction indicated by the dashed line in FIG. 1. The sheet P is conveyed to the reversing rollers 180. The CPU 200 causes the reversing rollers 180 to be normally rotated to convey the sheet P to the second reversing guide 170. After a lapse of a predetermined period after the fixing sensor 131 detects a trailing edge of the sheet P, the CPU 200 changes the direction of the duplex flapper 140 to the direction indicated by the solid line in FIG. 1 and causes the reversing rollers 180 to be reversely rotated to change the conveyance direction of the sheet P to the reverse direction. The CPU 200 causes the conveyance rollers 183 to convey the sheet P to the registration rollers 110 via the duplex conveyance path 181. The CPU 200 causes the registration rollers 110 to start to rotate in synchronization with the formation of the toner image to be formed on the second surface on the photosensitive drum 120, thereby conveying the sheet P to the transfer portion TP. In the subsequent operation, like in the image formation on the first surface of the sheet P, an image is formed on the second surface corresponding to the back surface that is opposite to the front surface of the sheet P having the image formed on the first surface thereof. In this manner, double-sided printing is performed on the sheet P. The sheet P subjected to double-sided printing is discharged onto the first tray 160 or the second tray 161 based on the discharge port data 302 in a state where the second surface of the sheet P faces downward. The above-described configuration and operation of the image forming apparatus 1 are merely examples, and the present disclosure is not limited to the above-described configuration and operation.

<Anti-Blocking Measures>

(1) Outline of Anti-Blocking Measures

Experimental results have proved that in the image forming apparatus 1 according to the present exemplary embodiment, if the temperature of each sheet P stacked on the first tray 160 or the second tray 161 exceeds 85° C., adhesion of discharged sheets, that is, blocking occurs.

The CPU 200 in the image forming apparatus 1 determines whether there is a need to perform an operation to avoid blocking based on the number of sheets P continuously stacked on one of the first tray 160 and the second tray 161 onto which the sheets P are discharged.

If the CPU 200 determines that there is a need to perform the operation to avoid blocking, the operation to avoid blocking is performed so that the subsequent sheets P are discharged after the temperature of each sheet P stacked on the first tray 160 or the second tray 161 is decreased. The operation to avoid blocking is executed to prevent the temperature of each sheet P from reaching 85° C., thereby preventing occurrence of blocking.

In the operation to avoid blocking, the sheets P are continuously printed in a state where productivity is lowered by increasing a sheet discharge interval for discharging the sheets P onto the first tray 160 or the second tray 161. The term "productivity" used herein refers to the number of sheets printed per unit time. The number of printed sheets is the number of sheets to be discharged onto the first tray 160 or the second tray 161 after printing. While the productivity is lowered (operation to avoid blocking is executed), the sheets P are naturally cooled to thereby prevent occurrence of blocking. When the operation to avoid blocking is executed, the timing of starting image forming processing on the subsequent sheet P is delayed to lower the productivity.

The operation to avoid blocking allows the sheets P stacked on the first tray 160 or the second tray 161 to be naturally cooled, thereby preventing occurrence of blocking.

(2) Tendency of Occurrence of Blocking Depending on Length of Conveyance Path

As the distance at which the sheet P is conveyed from the fixing roller 130 and stacked onto a discharge tray increases, the sheet P radiates more heat and a temperature rise until the temperature of the sheet P reaches the temperature at which blocking occurs becomes more gradual.

The distance at which the sheet P is conveyed from the fixing roller 130 and stacked onto the second tray 161 is longer than the distance at which the sheet P is discharged from the fixing roller 130 onto the first tray 160. Accordingly, a temperature rise when the sheet P is discharged onto the second tray 161 is more gradual than a temperature rise when the sheet P is discharged onto the first tray 160.

(3) Tendency of Occurrence of Blocking in Case of Using Fan

If a fan for generating an air flow is provided on a conveyance path, the sheet P being conveyed is cooled by the fan, which makes the temperature rise more gradual. The fan 171 for blowing air into the second conveyance path 152 is installed in the discharge unit 2.

For this reason, a temperature rise until the temperature of the sheet P reaches the temperature at which blocking occurs in the case of discharging the sheet P onto the second tray 161 becomes more gradual than that in the case of discharging the sheet P onto the first tray 160.

(4) Tendency of Productivity when Anti-Blocking Measures are Taken Depending on Length of Conveyance Path As the distance at which the sheet P is conveyed from the fixing roller 130 to the discharge port increases, a heat radiation period until the sheet P is discharged increases and a temperature rise when the sheet P is stacked on one of the first tray 160 and the second tray 161 is more gradual. As the temperature rise becomes more gradual, the heat radiation period of the sheet P stacked on the discharge tray can be reduced and deterioration in the productivity when the sheet P is discharged can be reduced.

The distance at which the sheet P is conveyed from the fixing roller 130 and stacked on the second tray 161 is longer than the distance at which the sheet P is conveyed from the fixing roller 130 and stacked on the first tray 160, which makes the temperature rise more gradual. Accordingly, the deterioration in the productivity when the sheet P is discharged onto the second tray 161 can be further reduced than that when the sheet P is discharged onto the first tray 160.

(5) Tendency of Productivity when Anti-Blocking Measures are Taken in Case of Using Fan If a fan for blowing air into a conveyance path is provided, the sheet P being conveyed is cooled by the fan, which makes a temperature rise when the sheet P is stacked on one of the first tray 160 and the second tray 161 more gradual. If the temperature rise becomes more gradual, the heat radiation period of the sheet P stacked on the discharge tray can be reduced and thus the deterioration in the productivity when the sheet P is discharged can be reduced.

The fan 171 for blowing air is installed in the discharge unit 2. Accordingly, in the case of discharging the sheet P onto the second tray 161, a temperature rise when the sheet P is stacked on the second tray 161 becomes more gradual than a temperature rise when the sheet P is stacked on the first tray 160, which makes it possible to reduce the deterioration in the productivity when the sheet P is discharged.

(6) Relationship between Discharge Destination and Operation to Avoid Blocking

By taking into consideration the tendencies (2) to (5) described above, in the present exemplary embodiment, the productivity when the operation to avoid blocking is executed is set depending on the discharge destination of the sheet P as illustrated in FIG. 4.

In the present exemplary embodiment, as illustrated in FIG. 4, the timing of starting the operation to avoid blocking is determined depending on the discharge destination to which the sheet P is discharged.

The "number of printed sheets" illustrated in FIG. 4 indicates the number of sheets that are continuously printed in a normal printing operation before starting the operation to avoid blocking (the number of sheets printed before starting anti-blocking measures). The normal printing operation corresponding to a first printing operation is a printing operation to be performed before starting the operation to avoid blocking as a second printing operation. Specifically, in the present exemplary embodiment, if the first tray 160 is set as the discharge destination, the operation to avoid blocking is started when 70 sheets that are continuously printed in the normal printing operation are discharged onto the first tray 160. If the second tray 161 is set as the discharge destination, the operation to avoid blocking is started when 85 sheets that are continuously printed in the normal printing operation are discharged onto the second tray 161.

The "productivity when anti-blocking measures are taken" illustrated in FIG. 4 indicates the percentage of productivity during the operation to avoid blocking when the productivity in the normal printing operation is 100%. In the present exemplary embodiment, during the normal printing operation, the number of sheets printed per minute is "60", regardless of which one of the first tray 160 or the second tray 161 is set as the discharge destination. Accordingly, if the first tray 160 is set as the discharge destination, the number of sheets printed per minute when the operation to avoid blocking is executed is "30". If the second tray 161 is set as the discharge destination, the number of sheets printed per minute when the operation to avoid blocking is executed is "45".

As described above, in the present exemplary embodiment, the timing for starting the operation to avoid blocking and the productivity when the operation to avoid blocking is executed are determined depending on which one of the first tray 160 and the second tray 161 is set as the discharge destination. Consequently, according to the present exemplary embodiment, it is possible to reduce the rate of deterioration in productivity while preventing occurrence of blocking.

<Flowchart (Main Operation)>

Figure 6:
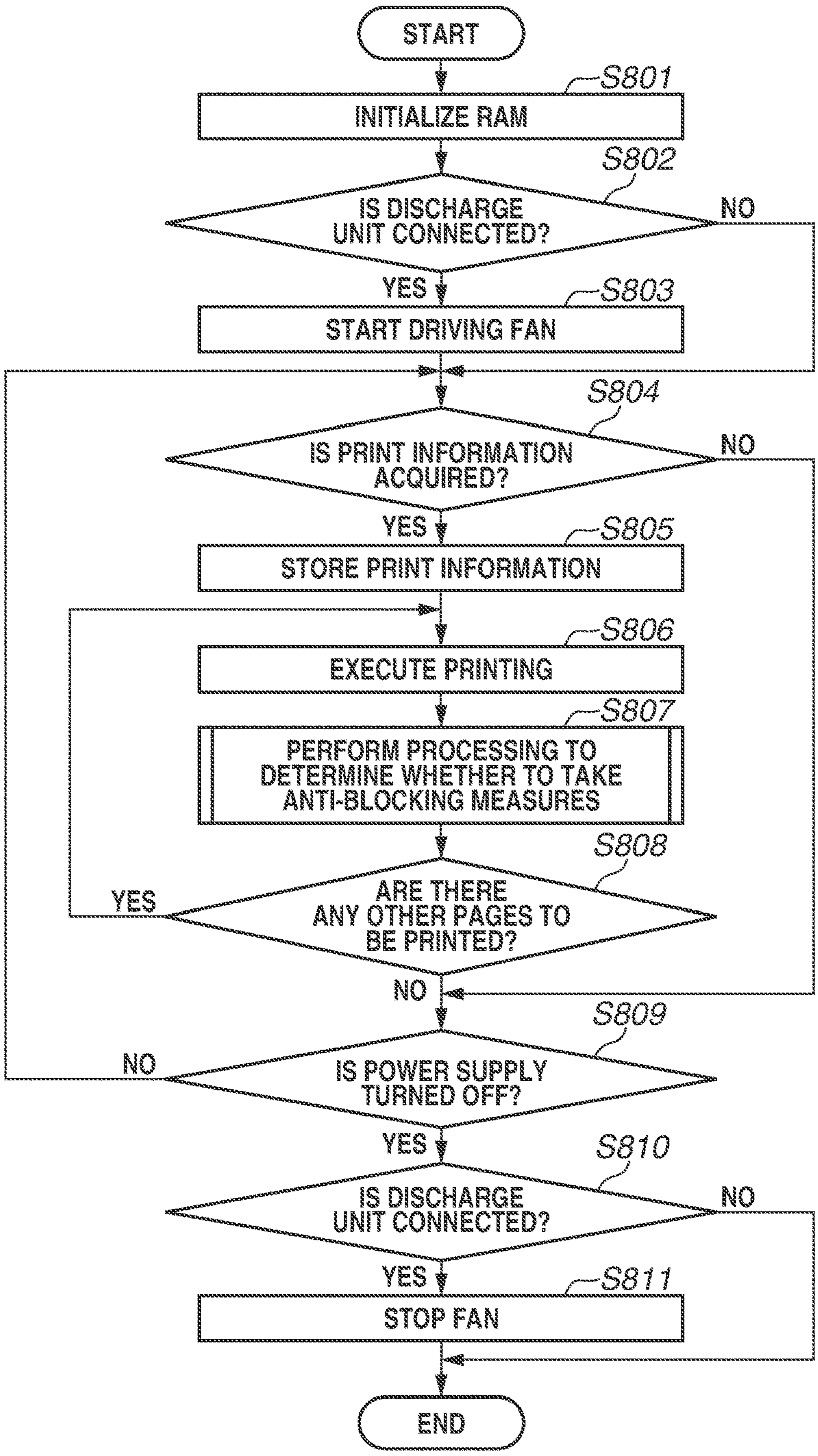
FIG. 6 is a flowchart illustrating a main operation.

Next, a main operation of the CPU 200 according to the present exemplary embodiment will be described with reference to FIG. 6. A control operation to be described below with reference to FIG. 6 is executed by the CPU 200 using the RAM 202 as a work area based on a program stored in the ROM 201.

When the image forming apparatus 1 is powered on, in step S801, the CPU 200 initializes the RAM 202. In step S802, the CPU 200 accesses the discharge unit I/F 230 to determine whether the discharge unit 2 is connected. If the CPU 200 determines that the discharge unit 2 is connected (YES in step S802), the processing proceeds to step S803. In step S803, the CPU 200 starts driving the fan 171 via the discharge unit I/F 230 as an initialization operation. If the CPU 200 determines that the discharge unit 2 is not connected (NO in step S802), the CPU 200 completes the initialization operation.

After completion of the initialization operation, the user starts printing based on the print information 310 (see FIG. 3) supplied from the external device 210 such as a PC, or starts copying using the image reading unit 191 via the operation display unit 190. In step S804, the CPU 200 determines whether print information is acquired. If the CPU 200 determines that print information is acquired (YES in step S804), the processing proceeds to step S805. In step S805, the CPU 200 stores the print information into the RAM 202. In step S806, the CPU 200 executes printing based on the print information stored in step S805. The CPU 200 determines whether there is a need to perform the operation to avoid blocking to be described below every time printing on the sheet P is finished, and in step S807, the CPU 200 executes the operation to take anti-blocking measures (operation to avoid blocking), as needed. After determining whether to take anti-blocking measures, in step S808, the CPU 200 determines whether there are any other pages to be printed. If the CPU 200 determines that there are any other pages to be printed (YES in step S808), the processing returns to step S806 to continuously execute print processing. If the CPU 200 determines that there are no other pages to be printed (NO in step S808), the CPU 200 completes the print processing and returns to a standby state.

In step S809, the CPU 200 determines whether the power supply is turned off. If the CPU 200 determines that the power supply is not turned off (NO in step S809), the processing returns to step S804. In step S804, the CPU 200 continuously determines whether print information is received from the external device 210 or the image reading unit 191. If the CPU 200 determines that the power supply is turned off (YES in step S809), the processing proceeds to step S810 and performs processing to stop each function. In step S810, the CPU 200 determines whether the discharge unit 2 is connected. If the CPU 200 determines that the discharge unit 2 is connected (YES in step S810), the processing proceeds to step S811. In step S811, the CPU 200 stops the fan 171 and performs processing to stop each function of the image forming apparatus 1 and then terminates the processing. If the CPU determines that the discharge unit 2 is not connected (NO in step S810), the CPU 200 performs processing to stop each function of the image forming apparatus 1 and then terminates the processing.

<Flowchart (Operation to Avoid Blocking)>

Figure 7:
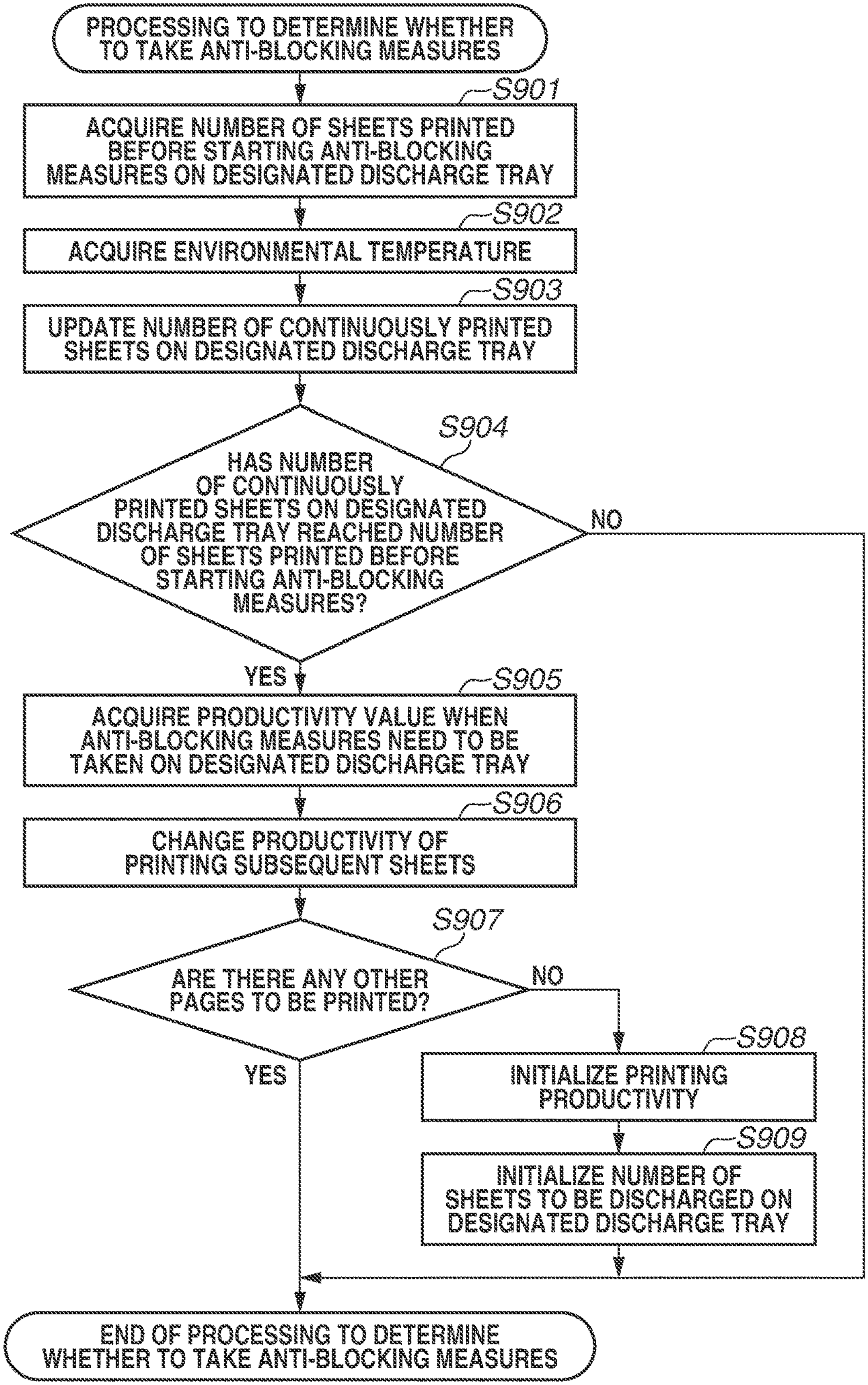
FIG. 7 is a flowchart illustrating processing to determine whether to take anti-blocking measures and an operation to be performed when anti-blocking measures are taken according to the first exemplary embodiment.

Next, processing to determine whether to take anti-blocking measures executed in step S806 illustrated in FIG. 6 and an operation to be performed when it is determined that there is a need to take anti-blocking measures will be described with reference to FIG. 7.

First, in step S901, the CPU 200 acquires the number of sheets printed before starting anti-blocking measures (hereinafter referred to as the number of sheets printed before starting anti-blocking measures) on one of the first tray 160 and the second tray 161 set as the discharge destination illustrated in FIG. 4. In step S902, the CPU 200 acquires the temperature from the temperature and humidity sensor 221. In step S903, the CPU 200 updates the number of continuously printed sheets in a normal operation. In step S904, the CPU 200 determines whether the number of continuously printed sheets has reached the number of sheets printed before starting anti-blocking measures. In the present exemplary embodiment, if the first tray 160 is set as the discharge destination, the CPU 200 determines that the number of continuously printed sheets has reached the number of sheets printed before starting anti-blocking measures when 70 sheets that are continuously printed in the normal printing operation are discharged onto the first tray 160. If the second tray 161 is set as the discharge destination, the CPU 200 determines that the number of continuously printed sheets has reached the number of sheets printed before starting anti-blocking measures when 85 sheets that are continuously printed in the normal printing operation are discharged onto the second tray 161.

If the CPU 200 determines that the number of continuously printed sheets has not reached the number of sheets printed before starting anti-blocking measures (NO in step S904), there is no need to perform the operation to take anti-blocking measures, and thus the CPU 200 checks subsequent print processing based on the print information stored in the RAM 202.

If the CPU 200 determines that the number of continuously printed sheets has reached the number of sheets printed before starting anti-blocking measures (YES in step S904), the processing proceeds to step S905. In step S905, the CPU 200 acquires the productivity value when there is a need to perform the operation to avoid blocking on one of the first tray 160 and the second tray 161 set as the discharge destination illustrated in FIG. 4. In step S906, the CPU 200 determines the productivity of printing the subsequent sheets P. In step S907, the CPU 200 determines whether there are any other pages to be printed. If there are any other pages to be printed (YES in step S907), the CPU 200 receives the subsequent print information and operates with lower productivity determined in step S906. Thus, the operation of continuously printing the sheets P with lower productivity corresponds to the operation to take anti-blocking measures (operation to avoid blocking). As described above with reference to FIG. 4, if the first tray 160 is set as the discharge destination, in the operation to take anti-blocking measures according to the present exemplary embodiment, printing is performed with 50% of productivity in the normal printing operation. If the second tray 161 is set as the discharge destination, in the operation to take anti-blocking measures, printing is performed with 75% of productivity in the normal printing operation.

If the CPU 200 determines that there are no other pages to be printed (NO in step S907), there is no need to lower the productivity. Accordingly, in step S908, the CPU 200 initializes the productivity. In step S909, the CPU 200 initializes the number of discharged sheets (the number of continuously printed sheets) on one of the first tray 160 and the second tray 161 set as the discharge destination. Then, the image forming apparatus 1 is ready for the subsequent print processing.

The first exemplary embodiment illustrates a configuration in which it is determined whether to perform the operation to avoid blocking based on the number of sheets printed before starting anti-blocking measures. However, it may be determined whether to perform the operation to avoid blocking based on a printing period corresponding to the number of sheets printed before starting anti-blocking measures. Specifically, a period during which the normal printing operation is executed may be measured using a timer and the operation to avoid blocking may be started when the measured period has reached a predetermined time set for each discharge destination.

The determination may be made by estimation based on the temperature set for the fixing roller 130 and the temperature of each of the first tray 160 and the second tray 161 supplied from the temperature and humidity sensor 221. For example, the number of sheets printed before starting anti-blocking measures and the printing period determined for each of the first tray 160 and the second tray 161 may be corrected based on the temperature set for the fixing roller 130 and the temperature supplied from the temperature and humidity sensor 221.

In the operation to avoid blocking according to the first exemplary embodiment, the productivity is lowered by increasing an interval between sheets (interval between the trailing edge of one sheet P and the leading edge of another sheet P following the sheet P), thereby preventing occurrence of blocking. As another method for lowering the productivity, a sheet discharge rate may be decreased to a predetermined sheet discharge rate set for each of the first tray 160 and the second tray 161.

As described above, according to the first exemplary embodiment, the number of printed sheets (number of stacked sheets) before starting the operation to take anti-blocking measures is determined for each of the first tray 160 and the second tray 161 set as the discharge destination. Accordingly, the determination on the deterioration in productivity due to anti-blocking measures can be extended. Furthermore, the rate of deterioration in productivity due to anti-blocking measures can be reduced.

The above-described exemplary embodiment illustrates a configuration in which the number of printed sheets before staring the operation to avoid blocking and the productivity when the operation to avoid blocking is performed are changed depending on the discharge destination. However, only one of the number of sheets printed before starting the operation to avoid blocking and the productivity when the operation to avoid blocking is performed may be changed depending on the discharge destination. In other words, the number of sheets printed before starting the operation to avoid blocking may be changed depending on the discharge destination, without changing the productivity when the operation to avoid blocking is performed depending on the discharge destination. Alternatively, the productivity when the operation to avoid blocking is performed may be changed depending on the discharge destination, without changing the number of sheets printed before starting the operation to avoid blocking depending on the discharge destination.

The operation of the image forming apparatus 1 may be returned to the normal printing operation after a lapse of a predetermined recovery time after the operation to take anti-blocking measures (operation to avoid blocking) is started. The term "predetermined recovery time" used herein refers to a period set to prevent blocking from occurring even after the normal printing operation is resumed. In this case, the operation to take anti-blocking measures (operation to avoid blocking) may be executed again after a predetermined number of sheets set for each discharge destination are printed (after a lapse of a predetermined period) in the resumed normal printing operation.

In the first exemplary embodiment, the productivity when the predetermined number of sheets are continuously printed is lowered as the operation to take anti-blocking measures. A second exemplary embodiment differs from the first exemplary embodiment in that printing is suspended as the operation to take anti-blocking measures. Descriptions of components and control operations similar to those of the first exemplary embodiment will be omitted, and only components and control operations different from those of the first exemplary embodiment will be described in detail.

In the second exemplary embodiment, the tendency of temperature rise of the sheet P depending on the distance at which the sheet P is conveyed from the fixing roller 130 and stacked on each of the first tray 160 and the second tray 161 and the tendency of temperature rise of the sheet P depending on the presence or absence of the fan for blowing air into the conveyance path are similar to those of the first exemplary embodiment.

In the present exemplary embodiment, specifically, if it is determined that there is a need to perform the operation to avoid blocking, the printing operation on the subsequent sheet P is suspended and a post-rotation operation is performed. Then, the printing operation is resumed after a lapse of a predetermined suspension period. When the printing operation is suspended, the sheets P stacked on the first tray 160 or the second tray 161 are naturally cooled and the temperature in the image forming apparatus 1 is decreased, thereby preventing occurrence of blocking.

When the printing operation is suspended, a temperature drop in the image forming apparatus 1 varies depending on the distance at which the sheet P is conveyed from the fixing roller 130 and stacked on each of the first tray 160 and the second tray 161, or depending on the presence or absence of the fan for blowing air into the conveyance path. Appropriate measures for each of the first tray 160 and the second tray 161 can be taken by reflecting the effect of the temperature in the image forming apparatus 1 depending on the sheet conveyance distance or depending on the presence or absence of the fan in a predetermined period during which the printing operation is suspended.

In the present exemplary embodiment, as illustrated in FIG. 5, a period during which the printing operation is suspended to perform the operation to avoid blocking is set depending on the discharge destination to which the sheet P is discharged. Further, in the present exemplary embodiment, as illustrated in FIG. 5, a timing for starting to suspend the printing operation as the operation to avoid blocking is determined depending on the discharge destination to which the sheet P is discharged.

The "number of printed sheets" illustrated in FIG. 5 indicates the number of sheets (the number of sheets printed before starting anti-blocking measures) that are continuously printed in the normal printing operation before starting to suspend printing as the operation to avoid blocking.

The normal printing operation is a printing operation to be performed before starting to suspend the printing operation to avoid blocking. Specifically, in the present exemplary embodiment, if the first tray 160 is set as the discharge destination, the operation to suspend the printing operation is started when 70 sheets that are continuously printed are discharged onto the first tray 160. If the second tray 161 is set as the discharge destination, the operation to suspend the printing operation is started when 85 sheets that are continuously printed are discharged onto the second tray 161.

The "suspension period for taking anti-blocking measures" illustrated in FIG. 5 indicates the length of time (suspension period) for suspending the printing operation to avoid blocking. In the present exemplary embodiment, during the normal printing operation, the number of sheets printed per minute is "60", regardless of which one of the first tray 160 and the second tray 161 is set as the discharge destination. Accordingly, during the normal printing operation, one second is set as the sheet discharge interval. In other words, each sheet P is discharged almost every second. In this case, if the first tray 160 is set as the discharge destination, the printing operation is suspended for 20 seconds to avoid blocking. If the second tray 161 is set as the discharge destination, the printing operation is suspended for 15 seconds to avoid blocking. The length of time for suspending the printing operation to avoid blocking is longer than the sheet discharge interval (one second) during the normal printing operation, regardless of which one of the first tray 160 and the second tray 161 is set as the discharge destination.

<Flowchart>

The main operation of the CPU 200 according to the second exemplary embodiment is similar to that of the first exemplary embodiment illustrated in FIG. 6. The processing to determine whether to take anti-blocking measures and the timing at which the operation is performed when it is determined that there is a need to take anti-blocking measures are also the same (in step S806 illustrated in FIG. 6) as in the first exemplary embodiment.

Figure 8:
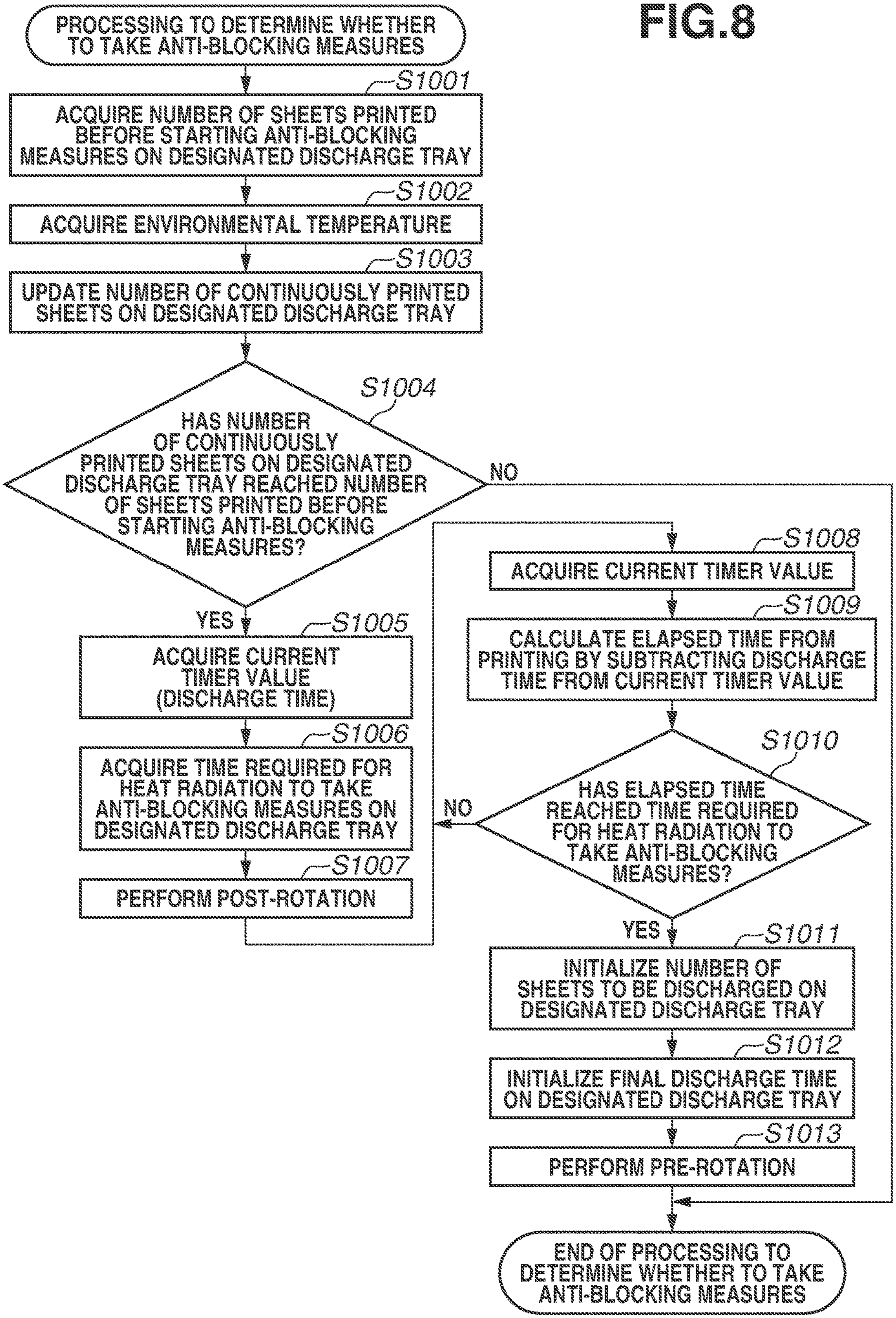
FIG. 8 is a flowchart illustrating processing to determine whether to take anti-blocking measures and an operation to be performed when anti-blocking measures are taken according to the second exemplary embodiment.

Next, processing to determine whether to take anti-blocking measures and an operation to be performed when it is determined that there is a need to take anti-blocking measures according to the second exemplary embodiment will be described with reference to FIG. 8.

First, in step S1001, the CPU 200 acquires the number of sheets printed before starting anti-blocking measures on one of the first tray 160 and the second tray 161 set as the discharge destination illustrated in FIG. 5. In step S1002, the CPU 200 acquires the temperature from the temperature and humidity sensor 221. In step S1003, the CPU 200 updates the number of continuously printed sheets that are actually printed in the normal operation. In step S1004, the CPU 200 determines whether the number of continuously printed sheets has reached the number of sheets printed before starting anti-blocking measures. In the present exemplary embodiment, if the first tray 160 is set as the discharge destination, the CPU 200 determines that the number of continuously printed sheets has reached the number of sheets printed before starting anti-blocking measures when 70 sheets that are continuously printed in the normal printing operation are discharged onto the first tray 160. If the second tray 161 is set as the discharge destination, the CPU 200 determines that the number of continuously printed sheets has reached the number of sheets printed before starting anti-blocking measures when 85 sheets that are continuously printed in the normal printing operation are discharged onto the second tray 161.

If the CPU 200 determines that the number of continuously printed sheets has not reached the number of sheets printed before starting anti-blocking measures (NO in step S1004), there is no need to perform the operation to take anti-blocking measures. Accordingly, the CPU 200 checks subsequent print processing based on the print information stored in the RAM 202.

If the CPU 200 determines that the number of continuously printed sheets has reached the number of sheets printed before starting anti-blocking measures (YES in step S1004), the processing proceeds to step S1005. In step S1005, the CPU 200 acquires a current timer value using a timer function (not illustrated) to acquire an elapsed time, and stores the current timer value as a final sheet discharge time in the RAM 202. In step S1006, the CPU 200 acquires a suspension period (period required for heat radiation to avoid blocking) corresponding to one of the first tray 160 and the second tray 161 set as the discharge destination illustrated in FIG. 5. In step S1007, the CPU 200 executes the post-rotation operation to suspend the printing operation. In step S1008, the CPU 200 acquires the current timer value to calculate the elapsed time from the printing operation. In step S1009, the CPU 200 calculates the elapsed time based on the difference between the current timer value and the final sheet discharge time stored in the RAM 202. In step S1010, the CPU 200 determines whether the elapsed time calculated in step S1009 has reached the suspension period (period required for heat radiation) acquired in step S1006. If the elapsed time has not reached the suspension period (NO in step S1010), the processing returns to step S1008 to repeatedly perform the acquisition of the current timer value and the calculation of the elapsed time until the elapsed time reaches the suspension period.

If the CPU 200 determines that the elapsed time has reached the suspension period (time required for heat radiation) acquired based on the table illustrated in FIG. 5 (YES in step S1010), the CPU 200 determines that heat radiation from the sheet P is sufficient and performs the initialization operation for the subsequent printing operation. Specifically, in step S1011, the CPU 200 initializes the number of stacked sheets, and in step S1012, the CPU 200 initializes the final sheet discharge time stored in the RAM 202. After completion of the initialization operation, in step S1013, the CPU 200 performs pre-rotation as a printing preparation operation to be ready for the subsequent print processing. After that, when the processing returns to step S808 in FIG. 6 and the CPU 200 determines that there are any other pages to be subsequently printed, the CPU 200 resumes the suspended printing operation in step S806.

The second exemplary embodiment described above illustrates a configuration in which it is determined whether there is a need to avoid blocking based on the number of printed sheets (the number of sheets printed before starting anti-blocking measures). However, it may be determined whether there is a need to avoid blocking based on a printing period corresponding to the number of printed sheets. Specifically, a period during which the normal printing operation is executed may be measured using a timer, and the printing operation may be suspended when the measured period has reached a predetermined period set for each discharge destination.

More alternatively, the determination may be made by estimation based on the temperature set for the fixing roller 130 and the temperature of each of the first tray 160 and the second tray 161 supplied from the temperature and humidity sensor 221. For example, the number of sheets printed before starting anti-blocking measures and the suspension period determined for each of the first tray 160 and the second tray 161 may be corrected based on the temperature set for the fixing roller 130 and the temperature supplied from the temperature and humidity sensor 221.

As described above, according to the second exemplary embodiment, the number of sheets printed before starting anti-blocking measures is determined for each discharge destination. This makes possible to prevent the printing operation from being suspended to take anti-blocking measures. Further, the rate of deterioration in productivity due to the operation to take anti-blocking measures can be reduced by setting the printing suspension period for each discharge destination in the operation to take anti-blocking measures.

The second exemplary embodiment described above illustrates a configuration in which both the number of sheets printed before starting to suspend the printing operation to avoid blocking and the suspension period are changed depending on the discharge destination. However, only one of the number of sheets printed before starting to suspend the printing operation and the suspension period may be changed depending on the discharge destination. In other words, the number of sheets printed before starting to suspend the printing operation to avoid blocking may be changed depending on the discharge destination, without changing the suspension period depending on the discharge destination. Alternatively, the suspension period may be changed based on the discharge destination, without changing the number of sheets printed before starting to suspend the printing operation based on the discharge destination.

In the first and second exemplary embodiments described above, the cooling capability of cooling the sheet P conveyed through a second conveyance unit including the second conveyance path 162 when the second tray 161 is set as the discharge destination is higher than the cooling capability of cooling the sheet P conveyed through a first conveyance unit including the first conveyance path 143 when the first tray 160 is set as the discharge destination. The above-described exemplary embodiments illustrate a configuration in which the fan 171 is used to blow air toward the sheet P conveyed to the second tray 161 via the second conveyance path 152 so as to increase the cooling capability of the second conveyance unit. However, the fan 171 can be omitted. Also, in this case, the sheet conveyance distance when the sheet P is discharged onto the second tray 161 via the second conveyance path 152 is longer than that when the sheet P is discharged onto the first tray 160 via the first conveyance path 143. Accordingly, the cooling capability of cooling the sheet P conveyed through the second conveyance unit including the second conveyance path 152 is higher than the cooling capability of cooling the sheet P conveyed through the first conveyance unit including the first conveyance path 143. In other words, sheet cooling conditions when the first tray 160 is set as the discharge destination are conditions in which the cooling capability of cooling the sheet P is lower than that in sheet cooling conditions when the second tray 161 is set as the discharge destination. Therefore, blocking is less likely to occur when the second tray 161 is set as the discharge destination than when the first tray 160 is set as the discharge destination.

The above-described exemplary embodiments illustrate a configuration in which the sheet conveyance distance when the sheet P is discharged onto the second tray 161 via the second conveyance path 152 is longer than that when the sheet P is discharged onto the first tray 160 through the first conveyance path 143 so as to increase the cooling capability of the second conveyance unit. However, the sheet conveyance distance when the sheet P is discharged onto the first tray 160 via the first conveyance path 143 may be the same as the sheet conveyance distance when the sheet P is discharged onto the second tray 161 via the second conveyance path 152. Alternatively, for example, the sheet conveyance distance when the sheet P is discharged onto the second tray 161 via the second conveyance path 152 may be slightly shorter than the sheet conveyance distance when the sheet P is discharged onto the first tray 160 via the first conveyance path 143. In any case, each sheet P conveyed to the second tray 161 through the second conveyance path 152 is cooled by air blown by the fan 171. Therefore, the second conveyance unit using the fan 171 has higher cooling capability. In other words, sheet cooling conditions when the first tray 160 is set as the discharge destination are conditions in which the cooling capability of cooling the sheet P is lower than that in the cooling conditions when the second tray 161 is set as the discharge destination. Accordingly, when the second tray 161 is set as the discharge destination, blocking is less likely to occur than when the first tray 160 is set as the discharge destination.

The fan 171 for blowing air (generating an air flow) toward the sheet P conveyed through the second conveyance path 152 is illustrated as an example of a cooling unit that cools the sheet P to be discharged onto the second tray 161. However, the cooling unit is not limited to this example. For example, a fan for generating an air flow to exhaust air (waste heat) from the second conveyance path 152 to cool the sheet P may be used as the cooling unit. Alternatively, a fan for blowing air toward the sheets P stacked on the second tray 161 may be used as the cooling unit to cool the sheets P.

According to an exemplary embodiment of the present disclosure, it is possible to prevent deterioration in productivity while preventing occurrence of blocking.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-132030, filed Aug. 13, 2021, which is hereby incorporated by reference herein in its entirety.

What is claimed is:

1. An image forming apparatus comprising:

a printing unit configured to print an image on a sheet and including a fixing unit configured to fix the image onto the sheet with heat;

a first conveyance unit configured to convey the sheet on which the image is printed by the printing unit;

a first stacking unit on which the sheet conveyed by the first conveyance unit is to be stacked;

a second conveyance unit configured to convey the sheet on which the image is printed by the printing unit and having a cooling capability higher than a cooling capability of the first conveyance unit;

a second stacking unit on which the sheet conveyed by the second conveyance unit is to be stacked; and a control unit configured to control the printing unit, wherein, in a case where the sheet is conveyed to the first stacking unit by the first conveyance unit, the control unit controls the printing unit to print the image on a first number of sheets as first sheets in a first printing operation and then to print the image on the first sheets in a second printing operation, wherein, in a case where the sheet is conveyed to the second stacking unit by the second conveyance unit, the control unit controls the printing unit to print the image on a second number of sheets as second sheets in the first printing operation and then is caused to print the image on the second sheets in the second printing operation, and wherein a number of sheets printed per unit time in the second printing operation is less than a number of sheets printed per unit time in the first printing operation, and the second number of sheets is greater than the first number of sheets.

2. The image forming apparatus according to claim 1, wherein the control unit controls the printing unit such that the number of sheets printed per unit time in the second printing operation in the case where the sheet is conveyed to the second stacking unit by the second conveyance unit is greater than the number of printed sheets per unit time in the second printing operation in the case where the sheet is conveyed to the first stacking unit by the first conveyance unit.

3. The image forming apparatus according to claim 1, wherein a path length of the first conveyance unit through which the sheet is conveyed is shorter than a path length of the second conveyance unit through which the sheet is conveyed.

4. The image forming apparatus according to claim 1, wherein the second conveyance unit includes a fan configured to cool the sheet on which the image is printed by the printing unit.

5. An image forming apparatus comprising:

a printing unit configured to print an image on a sheet, the printing unit including a fixing unit configured to fix the image onto the sheet with heat;

a first conveyance path through which the sheet on which the image is printed by the printing unit is conveyed;

a first stacking unit on which the sheet conveyed through the first conveyance path is stacked;

a second conveyance path through which the sheet on which the image is printed by the printing unit is conveyed;

a second stacking unit on which the sheet conveyed through the second conveyance path is stacked; and a control unit configured to control the printing unit, wherein the control unit controls the printing unit such that (i) a period from a time when a first printing operation of printing an image on a plurality of sheets is started to a time when a second printing operation of forming an image on a plurality of sheets is started in a case where the sheet is caused to pass through the first conveyance path and is conveyed to the first stacking unit is different from (ii) the period from the time when the first printing operation is started to the time when the second printing operation is started in a case where the sheet is caused to pass through the second conveyance path and is conveyed to the second stacking unit, and wherein a number of sheets printed per unit time in the second printing operation is less than a number of sheets printed per unit time in the first printing operation.

6. The image forming apparatus according to claim 5, wherein a path length of the first conveyance unit through which the sheet is conveyed is shorter than a path length of the second conveyance unit through which the sheet is conveyed, and wherein the control unit controls the printing unit such that (i) the period from the time when the first printing operation is started to the time when the second printing operation is started in the case where the sheet is caused to pass through the first conveyance path and is conveyed to the first stacking unit is shorter than the period from the time when the first printing operation is started to the time when the second printing operation is started in the case where the sheet is caused to pass through the second conveyance path and is conveyed to the second stacking unit.

* * * * *